United States Patent [19]

Miles

[11] 4,133,135
[45] Jan. 9, 1979

[54] FISHING LURE WITH DOUBLE SPINNER
[75] Inventor: James R. Miles, Winnsboro, La.
[73] Assignee: Miles Lure Co., Inc., Winnsboro, La.
[21] Appl. No.: 741,118
[22] Filed: Nov. 11, 1976
[51] Int. Cl.² ............................................. A01K 85/00
[52] U.S. Cl. .................................................. 43/42.13
[58] Field of Search ................ 43/15, 42.12, 42.13, 43/42.14, 42.15, 42.16, 42.24, 42.25, 42.26, 42.5, 42.19, 42.11

[56] References Cited
U.S. PATENT DOCUMENTS

| | | | |
|---|---|---|---|
| 653,204 | 8/1900 | Bacon | 43/42.19 |
| 706,941 | 8/1902 | Hildebrandt | 43/42.14 |
| 1,591,704 | 7/1926 | Grube | 43/42.16 |
| 2,281,578 | 5/1942 | Heddon | 43/42.13 |
| 2,804,714 | 9/1957 | Kratz | 43/42.19 |
| 3,095,664 | 8/1963 | Nichols | 43/42.19 |
| 3,118,244 | 1/1964 | Coburn | 43/42.13 |
| 3,143,824 | 8/1964 | Thomas | 43/42.11 |
| 3,253,363 | 5/1966 | Steehn | 43/42.13 |
| 3,293,790 | 12/1966 | Konomos | 43/42.15 |

Primary Examiner—Russell R. Kinsey
Assistant Examiner—Robert P. Swiatek
Attorney, Agent, or Firm—Clarence A. O'Brien; Harvey B. Jacobson

[57] ABSTRACT

A fishing lure in the form of a spinner bait having two wires supporting two spinner blades in alignment with a hook. In one embodiment, two wires extend from the head of the bait and are attached to the eye of the hook inside the head. Each wire includes a laterally extending portion in alignment with the hook and in alignment with each other for supporting a pair of spinner blades. The wires are secured together by a coil spring or other structure with the longer of the two wires having an attaching eye formed thereon for connection with a fishing line. In other embodiments, the two wires are connected to each other or associated with the head in various ways to retain alignment of the blades and hook. The two blades provide a lure which will run true and straight and reduce the tendency of spinner bait from rolling over or varying to the right or left. The two wires and the two spinner blades provide substantially more vibration to the lure as it is being retrieved through the water, thus rendering it much more attractive to the fish.

13 Claims, 8 Drawing Figures

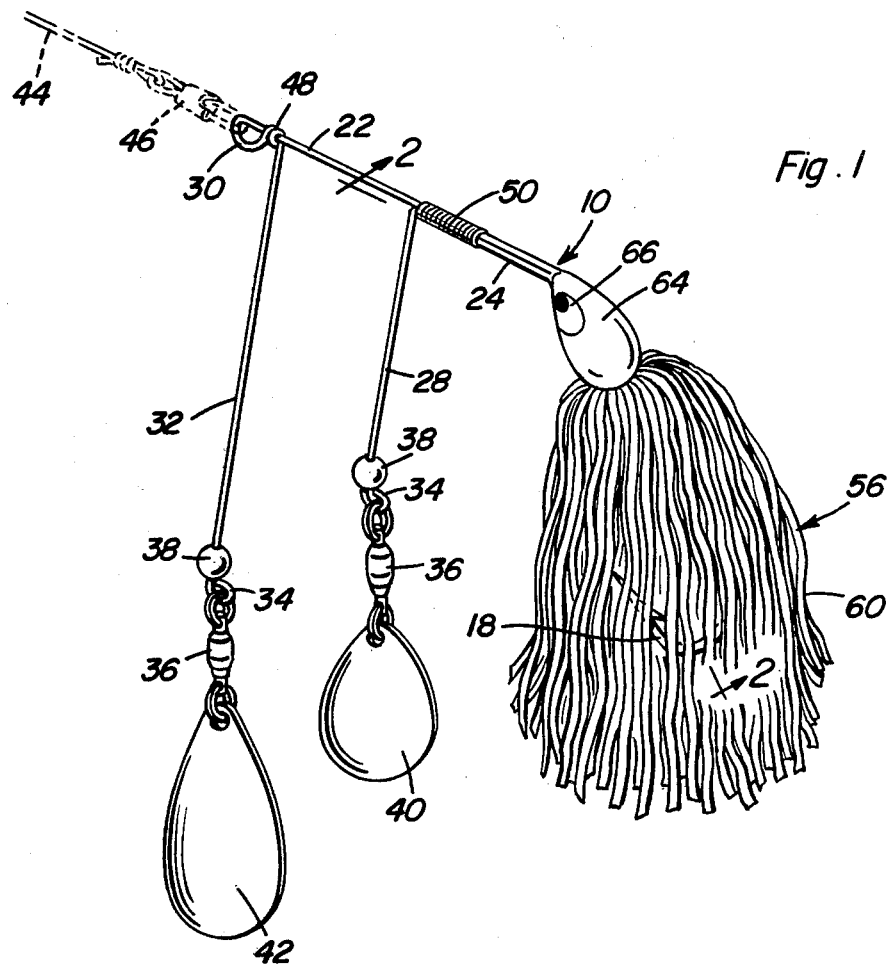
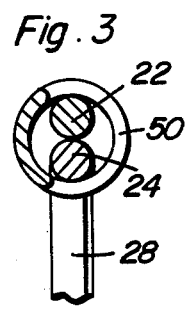
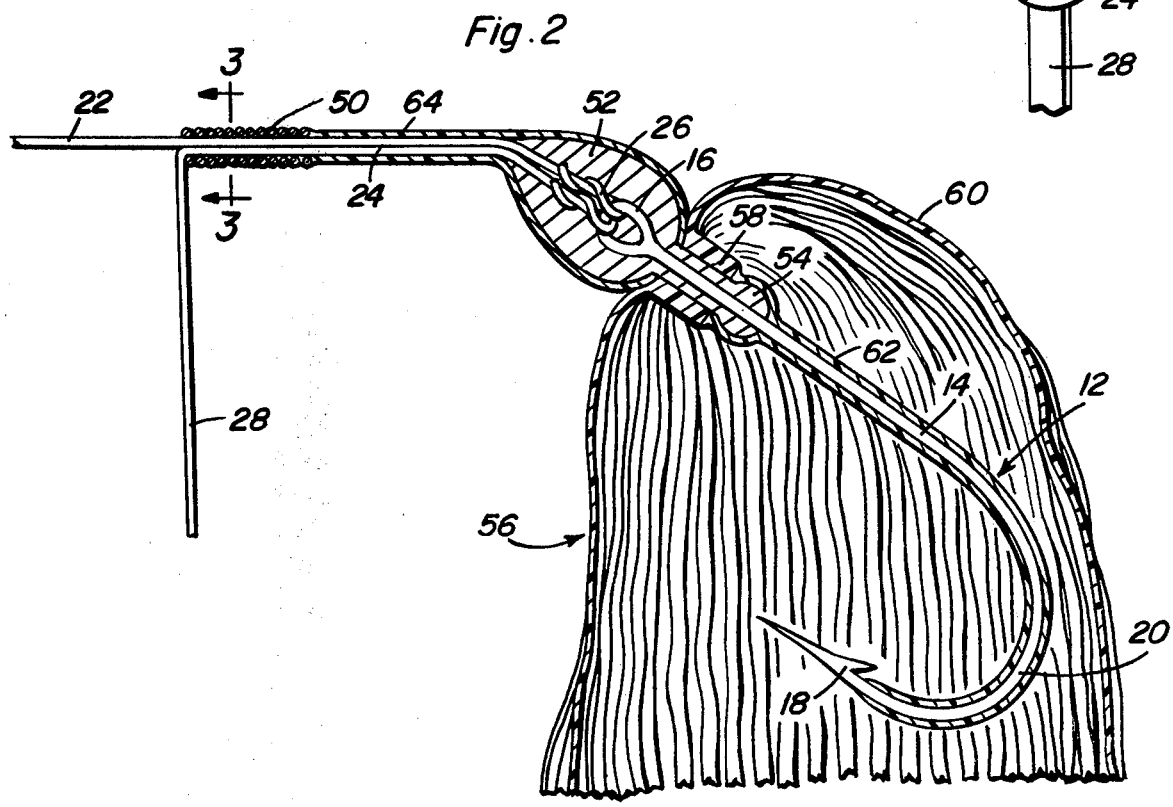

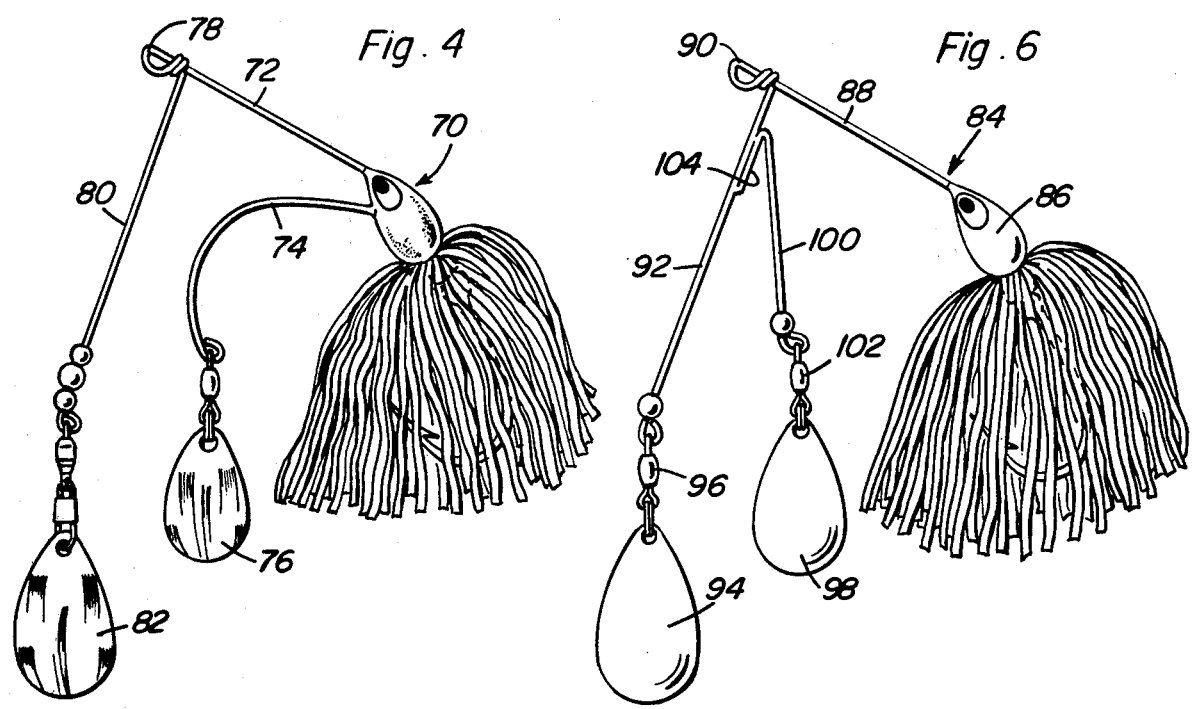
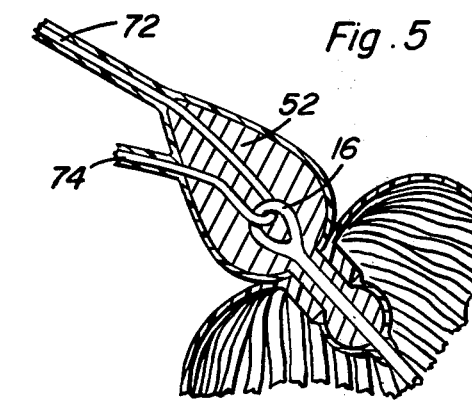
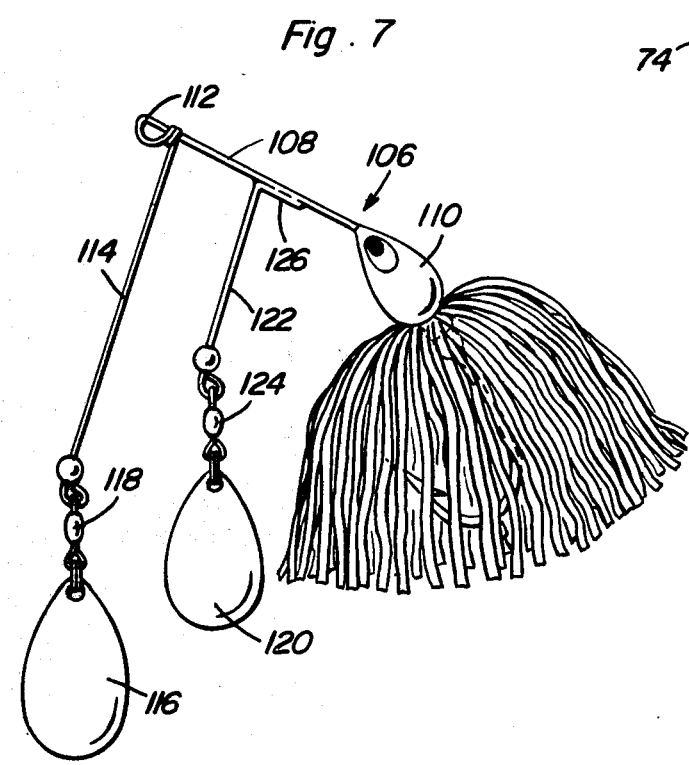
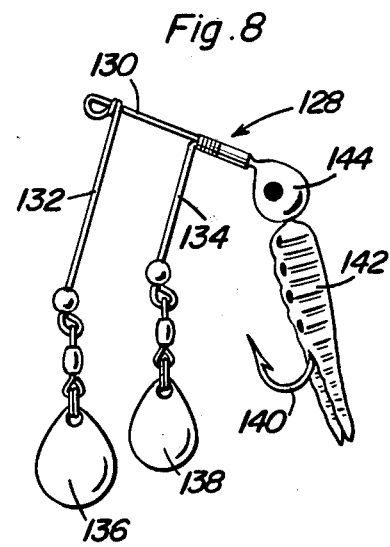

FISHING LURE WITH DOUBLE SPINNER

BACKGROUND OF THE INVENTION

1. Field of the Invention

The present invention generally relates to a fishing lure or spinner bait and more particularly a bait having two spinners associated with a hook with the spinners being independently supported by a pair of wires attached to the lure with the spinners, wires and hook being aligned.

2. Description of the Prior Art

Many fishing lures have been developed utilizing a hook concealed with feathers, hair, fibers, or fringe-like material forming a skirt combined with a rotatable spinner or spoon structure secured to the lure by a swivel mechanism to enable the spinner to rotate due to relative movement between the water and the lure. The surfaces of the spinner are bright or shiny to provide a flashing effect which will attract fish. Examplary prior U.S. patents disclosing fishing lures of this type are as follows:

U.S. Pat. Nos: 1,295,617 — Feb. 25, 1919 — Shannon, 1,874,883 — Aug. 30, 1932 — Brown, 1,995,985 — Mar. 26, 1935 — Jennings, 2,167,945 — Aug. 1, 1939 — Gilliam, 3,093,923 — June 18, 1963 — Jackson, 3,747,256 — July 24, 1973 — Haddock.

SUMMARY OF THE INVENTION

An object of the present invention is to provide a fishing lure in the form of a spinner bait having two spinning blades associated with a fishhook in which each of the blades are independently supported by an independent wire attached to the lure with the blades being aligned with the hook.

Another object of the invention is to provide a fishing lure in accordance with the preceding object in which two wires extend alongside of each other with one wire being longer than the other and with both wires including a laterally offset portion having a swivel and spinning blade attached to the outer end thereof.

Still another object of the above invention is to provide a fishing lure in accordance with the preceding objects in which the side-by-side portions of the two wires are secured together adjacent the laterally extending portion of the shorter wire by various structures such as by the use of a wire wrapped around the side-by-side wires with the wrapping wire preferably being in the form of a coil spring snugly and securely retaining the two wires in secure relationship with the side-by-side wires being disposed one above the other.

A further important object of the invention is to provide a fishing lure in accordance with the preceding objects in which the laterally extending portions of the wires and the spinner blades are in the same plane as the shank and barb of the hook, whereby the orientation of the center of gravity of the lure and its connection with a fishing line, leader, or the like, combined with the aligned relation of the spinner blades and hook will assure that the lure will travel in a true and straight path during retrieval of the lure through the water or during movement of the lure through the water.

Yet another important feature of the present invention is to provide a spinner bait or fishing lure in accordance with the preceding objects which is effective for the purposes of attracting fish, strong and durable, constructed to increase vibration and rotational flashing during movement through the water and attractive in appearance and enticing to fish.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the fishing lure of the present invention illustrating the association of the components thereof.

FIG. 2 is a longitudinal, sectional view taken substantially upon a plane passing along section line 2—2 of FIG. 1 illustrating the specific structural details of the two independent wires and their connection to the eye of the hook and the encapsulation thereof by the head of the lure.

FIG. 3 is a transverse, sectional view, on an enlarged scale, taken substantially upon a plane passing along section line 3—3 of FIG. 2 illustrating the structural details of the coil spring securing the two wires together.

FIG. 4 is a side elevational view of another embodiment of the lure.

FIG. 5 is a fragmental sectional view of the head used in FIG. 4.

FIG. 6 is a side elevational view of a further embodiment of the lure.

FIG. 7 is a side elevational view of still another embodiment of the lure.

FIG. 8 is a side elevational view of an embodiment of a beetle type lure.

DESCRIPTION OF THE PREFERRED EMBODIMENTS

The spinner bait or fishing lure of the present invention is generally designated by numeral 10 and includes a fishhook 12 including a shank 14 having an eye 16 at one end and a hook barb 18 at the other end which is reversely curved at 20 in a conventional manner. Attached to the eye 16 of the hook 12 is a pair of elongated wires 22 and 24 each of which is attached to the eye 16 by extending the terminal end of the wires 22 and 24 therethrough, reversely bending the same and twisting the wires onto themselves as indicated at 26. The wires 22 and 24 extend alongside each other with the wire 22 being above the wire 24 and the wire 22 being longer than the wire 24 as illustrated in FIG. 1.

The wire 24 is provided with a laterally extending portion 28 and the wire 22 is provided with a loop or eye 30 forming an end thereon and a laterally extending portion 32 which is parallel to the laterally extending portion 28 and in spaced relation thereto as illustrated in FIG. 1 with the laterally extending portion 32 being longer than the portion 28. Each laterally extending portion 28 and 32 terminates in a loop forming an eye 34 to which is connected a conventional swivel 36. Also, each laterally extending portion 32 and 28 is provided with one or more beads 38 freely slidable thereon and colored a desired attractive color. Also, each swivel 36 is provided with a spinner blade with the spinner blade 40 connected to the laterally extending portion 28 being slightly smaller than the spinner blade 42 attached to the laterally extending portion 32 with the spinner blade 40 being disposed inwardly in relation to the spinner blade 42. Each of the spinner blades have one surface thereof being concave and the other surface being convex and both surfaces are provided with a bright or shiny appearance so that they will produce a flashing effect when rotated. Also, as illustrated, the laterally extending portions 28 and 32 of the wires as well as the blades 40 and 42 are in alignment with each other and also in alignment with the shank 14, barb 18 and reversely curved portion 20 of the hook 12, and the attaching loop or eye 30 is in the same plane and enables connection to a fishing line or leader 44 through a conventional swivel 46 or other conventional attaching means. The loop or eye 30 is formed by reversely bending the wire 22 and bending it around itself as at 48.

The two wires 22 and 24 are connected together by a coil spring 50 encircling the two wires at the laterally extending portion 28 as illustrated in FIG. 2, thus securely retaining the two wires 22 and 24 alongside of each other. Other types of rigid securement may be used in lieu of the coil spring 50 such as a metal clip, spot welding, or any other means for securing the two wires 22 and 24 together in this area.

The eye 16 and twist connection as well as a portion of the shank 14 is encapsulated by lead 52 having a generally spherical bulbous portion 54 on the shank thereof. A skirt 56 is attached to the lure by a plastic sleeve 58 of vinyl, or the like, pushed over the bulbous portion 54 of the lead with the sleeve 58 including a plurality of strips 60 of flexible plastic material of a desired color with the strips being sufficiently long to cover and enclose the hook 12 but enable the fish to have access thereto. The shank portion of the hook as well as the reversely bent portion and the portion of the lead not covered by the sleeve 58 is provided with a paint coating 62 of a color the same as the color of the skirt 56. Also, the lead head 52 and the wires 22 and 24 are covered with a paint coating 64 of the same color and a simulated eye 66 is provided on the lead 52 to enhance the attraction of fish to the lure.

FIGS. 4 and 5 illustrate an embodiment of the lure, generally designated by numeral 70, in which a single wire 72 is looped through the eye 16 of the hook and is embedded in the lead 52 which forms the head of the lure. In this construction, the wire 72 continues as a supporting wire 74 in the form of an arcuate wire member which supports the spinner blade 76 in the same orientation as the spinner blade 40 in FIG. 1. The wire 72 at the end thereof remote from the hook is provided with an eye 78, a supporting wire 80 and a spinner blade 82 which correspond to the eye 30, supporting wire 32 and spinner blade 42 illustrated in FIG. 1. In this embodiment of the invention, the spinner blades are provides with decorative surfaces, such as, painted surfaces having decorative stripes or partial stripes thereon of a distinguishable color. The alignment of the spinner blades 76 and 82 with the hook remains substantially the same as the relationship illustrated in FIG. 1. and the remainder of the structure is the same as illustrated in FIGS. 1-5.

FIG. 6 illustrates another embodiment of the lure generally designated by numeral 84 which includes a weighted head 86 and hook assembly which is the same as that illustrated in the other embodiments of the invention with a wire 88 being embedded in the head 86 and attached to the eye of the hook. The opposite end of the wire 88 is provided with an eye 90, a supporting wire 92 extending therefrom and a spinner blade 94 connected thereto by a swivel 96 in the same manner as the supporting wire 80 and spinner blade 82 in FIG. 4.

In this embodiment of the invention, a spinner blade 98 is supported by a wire 100 through a swivel 102 with the end of the wire 100 remote from the swivel 102 being reversely bent into an attaching portion 104 that is securely attached to the supporting wire 92 adjacent the connecting loop or eye 90 as illustrated in FIG. 6. The connection between the attaching portion 104 and the wire 92 may be a welded connection or any other suitable rigid connection, such as a coil wire, metal clip, or the like. The relationship of the spinner blades 94 and 98 to the hook remains the same, that is, the spinner blades are in alignment with the hook and are on the same side of the wire 88 as the hook.

FIG. 7 illustrates another embodiment of the lure 106 which includes a wire 108 having a weighted head 110 connected at one end, a connecting eye 112 at the other end forming a continuing attaching wire 114 supporting a spinner blade 116 through a swivel 118. A second spinner blade 120 is connected to a supporting wire 122 through a swivel 124 and is oriented in the same relationship as the other embodiments. The end of the supporting wire 122 remote from the blade 120 is provided with an angulated attaching portion 126 that is disposed alongside of the wire 108 and is attached thereto, such as by spot welding, or other suitable attaching means. The relationship of the spinner blades 116 and 120 remain the same and are aligned with the hook in the same manner.

FIG. 8 illustrates another embodiment of the lure generally designated by numeral 128 in which the connecting wire 130 and two supporting wires 132 and 134 are the same relationship as in FIG. 1 with the two blades 136 and 138 being associated in the same manner. However, the fishhook 140 in this embodiment of the invention is provided with a body 142 simulating a beetle, worm, or other bait. The weighted head 144 simulates the head of the beetle or other bait with this material being vinyl plastic, or the like. The size characteristics of the lure 128 is substantially smaller than that illustrated in FIG. 1 and it is pointed out that various baits, such as simulated worms, insects, and the like, may be associated with the hook depending upon the individual requirements or desires of a fisherman.

In all embodiments of the invention, the spinning blades are retained in aligned relation to each other and in alignment with the fishhook with the blade adjacent the fishhook being slightly inwardly spaced in relation to the spinning blade which is remote from the hook. The blades may be of solid color, provided with a shiny or bright surface or decorated with various paintstriping, and the like. The color characteristics and the external ornamentation of the weighted head and skirt or simulated bait 142 may also be varied for realistic appearance.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A fishing lure comprising a hook having a weighted head, a wire extending from said head and including means thereon for connection with a fishing line, and a pair of spinner blades mounted on said lure in alignment with each other and in alignment with the hook, said blades being spaced from each other and spaced from the wire and being oriented only on the same side of the wire as the hook whereby the orientation of the center of gravity of the lure combined with the aligned relation of the spinner blades and hook will assure that the lure is stabilized during relative movement between the lure and the water, said hook including a shank portion and a hook portion, said spinner blades being in alignment with the hook portion of the hook, each of said spinner blades being swivelly supported from the terminal end of a supporting wire, the spinner blade adjacent the hook and the spinner blade remote from the hook being supported from separate laterally extending wires rigid and fixed with respect to the wire extending from the weighted head, the laterally extending wire for the adjacent spinner blade forming a continuation of a second wire alongside of the wire extending from the head with the second wire also being rigid with the weighted head, the other laterally extending wire being unitary with the wire extending from the weighted head, and means securing the second wire and the wire extending from the weighted head together at the point thereof adjacent the laterally extending wire which forms a continuation of the second wire, said means securing the wire extending from the weighted head and the second wire including a small spiral spring encircling the wires and rigidly securing them together.

2. The structure as defined in claim 1 wherein said hook includes a skirt secured thereto with the skirt including a sleeve adjacent the weighted head and a plurality of fringe forming strips secured to the sleeve for enclosing the hook but enabling access thereto by a fish striking the hook.

3. The structure as defined in claim 1 wherein said hook includes a body thereon simulative of bait with the body enclosing the weighted head and a substantial portion of the hook.

4. In a fishing lure adapted to be conected to a fishing line and supporting a fishhook and a pair of tandemly arranged spinners therefrom, that improvement consisting only of a longitudinally extending wire member, means at one end of said wire member for connecting with a fishing line, means at the other end of said wire member for connection with the eye of a fishhook, a pair of laterally extending wire members rigid and fixed with respect to said longitudinally extending wire member and being disposed in the same plane to only one side of the longitudinally extending wire member, and means on the terminal end of each laterally extending wire member for supportively connecting a spinner, said means for connecting a spinner being disposed in longitudinally spaced relation to each other, laterally spaced from the longitudinally extending wire member and in the same plane as the wire members whereby the orientation of the center of gravity of the lure combined with the planar relation of the wire members will assure that the spinners will retain the lure stable during relative movement between the lure and water.

5. The structure as defined in claim 4 wherein said laterally extending wire member adjacent said fishhook connection means has its terminal end disposed closer to the longitudinal wire member than the terminal end of the laterally extending wire member adjacent the fishline connection means, said fishline connection means including a loop formed in the longitudinally extending wire member, said laterally extending wire member adjacent the loop being a continuation of the loop, said longitudinally extending wire member, loop and adjacent laterally extending wire member being of unitary construction and disposed in the same plane with the major portion of the loop being disposed on the same side of the longitudinally extending wire member as the laterally extending wire members.

6. The structure as defined in claim 5 wherein the laterally extending wire member adjacent the means for connection with the fishhook forming a continuation of the longitudinally extending wire member and curving arcuately toward the other laterally extending wire member with the concave portion of the curve facing toward the fishook connection means.

7. The structure as defined in claim 5 wherein said laterally extending wire members are in parallel relation to each other and rigidly connected with said longitudinally extending wire member in perpendicular relation thereto.

8. The structure as defined in claim 7 wherein the other laterally extending wire member includes a portion disposed alongside the longitudinally extending wire member, and means securing said portion to said longitudinally extending wire member.

9. The structure as defined in claim 8 wherein said securing means includes a spiral spring tightly wrapped around said portion and the longitudinally extending wire.

10. The structure as defined in claim 8 wherein said securing means includes a rigid attachment of the portion to the longitudinally extending wire member.

11. A fishing lure comprising a hook having a weighted head, a wire extending from said head and including means thereon for connection with a fishing line, and a pair of spinner blades mounted on said lure in alignment with each other and in alignment with the hook, said blades being spaced from each other and spaced from the wire and being oriented on the same side of the wire to stabilize the lure during relative movement between the lure and the water, said hook including a shank portion and a hook portion, said spinner blades being in alignment with the hook portion of the hook, each of said spinner blades being swivelly supported from the terminal end of a supporting wire, the spinner blade remote from the hook being connected to a laterally extending wire rigid with the wire extending from the weighted head, said spinner blade adjacent the hook being supported from a wire connected to the laterally extending wire for supporting the remote spinner blade.

12. A fishing lure comprising a hook having a weighted head, a wire extending from said head and including means thereon for connection with a fishing line, and a pair of spinner blades mounted on said lure in alignment with each other and in alignment with the hook, said blades being spaced from each other and spaced from the wire and being oriented only on the same side of the wire as the hook whereby the orientation of the center of gravity of the lure combined with the aligned relation of the spinner blades and hook will assure that the lure is stabilized during relative movement between the lure and the water, said hook including a shank portion and a hook portion, said spinner blades being in alignment with the hook portion of the hook, each of said spinner blades being swivelly supported from the terminal end of a supporting wire, the spinner blade adjacent the hook being mounted on a wire supporting arm connected with the weighted head and extending laterally therefrom, the spinner blade remote from the hook being connected to a laterally extending wire rigid with the wire extending from the weighted head and having means thereon for connection with a fishing line with both laterally extending wires being fixed with respect to the wire extending from the weighted head.

13. In a fishing lure adapted to be connected to a fishing line and supporting a fishhook and a pair of tandemly arranged spinners therefrom, that improvment comprising a longitudinally extending wire member, means at one end of said wire member for connection with a fishing line, means at the other end of said wire member for connection with the eye of a fishhook, a pair of laterally extending wire members rigid with respect to said longitudinally extending wire member and being disposed in the same plane to only one side of the longitudinally extending wire member, and means on the terminal end of each laterally extending wire member for supportively connecting a spinner, said means for connecting a spinner being disposed in longitudinally spaced relation to each other, laterally spaced from the longitudinally extending wire member and in the same plane as the wire members thereby assuring that the spinners will retain the lure stable during relative movement between the lure and water, said laterally extending wire member adjacent the fishhook connecting means including an end portion extending alongside of and rigidly secured to the other laterally extending wire member adjacent to the longitudinally extending wire member, said laterally extending wire member adjacent the fishhook connecting means diverging from the other laterally extending wire member from its point of securement thereto.

* * * * *